(12) United States Patent
Imafuku

(10) Patent No.: US 6,958,695 B1
(45) Date of Patent: Oct. 25, 2005

(54) ARTICLE MONITORING APPARATUS AND SYSTEM

(75) Inventor: Kunihiko Imafuku, Tokyo (JP)

(73) Assignees: Sensormatic Electronics Corporation, Boca Raton, FL (US); Takachiho Koheki Co., Ltd., Tokyo (JP)

( * ) Notice: Subject to any disclaimer, the term of this patent is extended or adjusted under 35 U.S.C. 154(b) by 0 days.

(21) Appl. No.: 09/914,618

(22) PCT Filed: Feb. 29, 2000

(86) PCT No.: PCT/JP00/01163
§ 371 (c)(1),
(2), (4) Date: Dec. 3, 2001

(87) PCT Pub. No.: WO00/52656
PCT Pub. Date: Sep. 8, 2000

(30) Foreign Application Priority Data
Mar. 1, 1999 (JP) ........................... 11-053357

(51) Int. Cl.⁷ .............................................. G08B 13/14
(52) U.S. Cl. ................. 340/568.1; 340/571; 340/572.1; 235/444
(58) Field of Search .............................. 340/568.1, 571, 340/572.1, 572.4, 572.7; 235/444, 449

(56) References Cited

U.S. PATENT DOCUMENTS

| | | | |
|---|---|---|---|
| 3,665,448 A | * | 5/1972 | McGlinchey et al. .... 340/568.1 |
| 4,573,042 A | | 2/1986 | Boyd et al. |
| 4,686,513 A | * | 8/1987 | Farrar et al. .............. 340/572.1 |
| 5,327,118 A | * | 7/1994 | Drucker et al. .......... 340/572.1 |
| 5,440,296 A | * | 8/1995 | Nelson .................... 340/572.1 |
| 5,729,202 A | * | 3/1998 | Klaehn .................... 340/572.1 |
| 5,748,086 A | | 5/1998 | Bettine et al. |
| 5,801,631 A | * | 9/1998 | Hayashi ................... 340/572.1 |
| 5,808,548 A | | 9/1998 | Sasagawa et al. |
| 6,304,181 B1 | * | 10/2001 | Matsudaira ................. 340/571 |
| 6,310,963 B1 | * | 10/2001 | Erdol et al. ................. 382/103 |

FOREIGN PATENT DOCUMENTS

JP 2-43228 9/1990

* cited by examiner

*Primary Examiner*—Toan Pham
(74) *Attorney, Agent, or Firm*—Burns, Doane, Swecker & Mathis, LLP

(57) ABSTRACT

A tag has an intelligent function such that when radiation of a burst signal synchronized with a power source frequency from a transmission antenna (20) is detected, it transmits a response burst signal after completion of reception. Then, when a predetermined number of burst signals have been detected, the tag outputs an alarm. Also, an alarm device main body outputs an alarm when a predetermined number of response burst signals have been received. To provide article monitoring apparatus and article monitoring system which determine whether or not an unpaid article is taken out with reliability. According to the present invention, it is possible to provide article monitoring apparatus and article monitoring system which determine whether or not an unpaid article is taken out with reliability.

32 Claims, 5 Drawing Sheets

ARTICLE MONITORING APPARATUS AND SYSTEM

This application is a 371 of PCT/JP00/01163 filed Feb. 2, 2000.

TECHNICAL FIELD

The present invention relates to an article monitoring apparatus which is attached to an article and monitors movement of the article, for which payment has not been made, into a predetermined position, and an article monitoring system which monitors the movement of the article monitoring apparatus to a predetermined region.

BACKGROUND ART

As a conventional article monitoring apparatus to monitor movement of an article, for which payment has not been made, from a predetermined region, Japanese Published Examined Patent Application No. 2-43228 discloses an apparatus comprising an alarm device having a transmission antenna which transmits radiant energy within a predetermined region and a reception antenna which receives the radiant energy from the transmission antenna, and an article monitoring apparatus attached to an article to be monitored. When the article monitoring apparatus approaches the alarm device, the approach is detected, and the alarm device outputs an alarm.

Further, another article monitoring apparatus outputs an alarm by the apparatus itself when it is removed from an article.

Further, in another arrangement, a transmission antenna which transmits a predetermined electromagnetic wave or a radio wave of a predetermined frequency is set at, e.g., an entrance of shop floor, and when an article monitoring apparatus attached to an article detects the electromagnetic wave or radio wave from the transmission antenna, the article monitoring apparatus outputs an alarm.

However, in these apparatuses, occurrence of a false alarm is a serious problem. That is, an alarm is sounded even if no unpaid article has been taken out, or the attached apparatus has not been removed from the article. In such cases, an inappropriate reaction to customers will result in gross negligence.

Accordingly, in this type of system, it is necessary to precisely determine whether or not an alarm has been outputted because of a false alarm.

DISCLOSURE OF INVENTION

The present invention has been made so as to solve the above-described problem, and has its object to provide article monitoring apparatus and article monitoring system which enable precise determination as to whether or not an unpaid article has been misappropriated. As a means to attain the above object, the following construction is provided.

Provided is an article monitoring apparatus, attached to an article, monitored by an alarm device having a transmission antenna for transmitting radiant energy within a predetermined region and a reception antenna for receiving the radiant energy outputted periodically, from said transmission antenna, said apparatus comprising: an antenna which receives the radiant energy from said transmission antenna of said alarm device and transmits radiant energy from said apparatus to a reception antenna; alarm output means for outputting an alarm in response to reception of said radiant energy by said reception antenna; and control means for emitting radiant energy in the same frequency to that of said received radiant energy from said transmission antenna, in response to reception of said radiant energy by said antenna, and driving said alarm output means when detecting a predetermined number of reception of said radiant energy.

For example, said control means transmits radiant energy corresponding to the received radiant energy, transmitted after reception of radiant energy, via said antenna. Said control means includes removal detection means for detecting whether or not said apparatus has been removed from the article, and said control means drives an alarm output means when by detection of removal by said removal detection means.

For example, said control means includes mute means for setting said alarm means to an inhibit state when detecting reception of radiant energy of a predetermined pattern from said antenna. Said control means includes a one-chip computer and an operation control procedure for said one-chip computer.

Further, provided is an article monitoring system having the article monitoring apparatus in any one of claims 1 to 4 and an alarm device which outputs an alarm in correspondence with sensing approach of said article monitoring apparatus, wherein said alarm device comprising: a transmission antenna which transmits radiant energy within a predetermined region; a transmission controller which transmits radiant energy from said transmission antenna in a predetermined frequency; a reception antenna which receives the radiant energy from said transmission antenna; alarm output unit for outputting an alarm when detecting radiant energy of a similar frequency to that of the radiant energy from said transmission antenna a predetermined number of times, following reception of the radiant energy from said transmission antenna.

BEST MODE FOR CARRYING OUT THE INVENTION

Hereinbelow, an embodiment of the present invention will be described in detail with reference to attached drawings.

Figure 1:
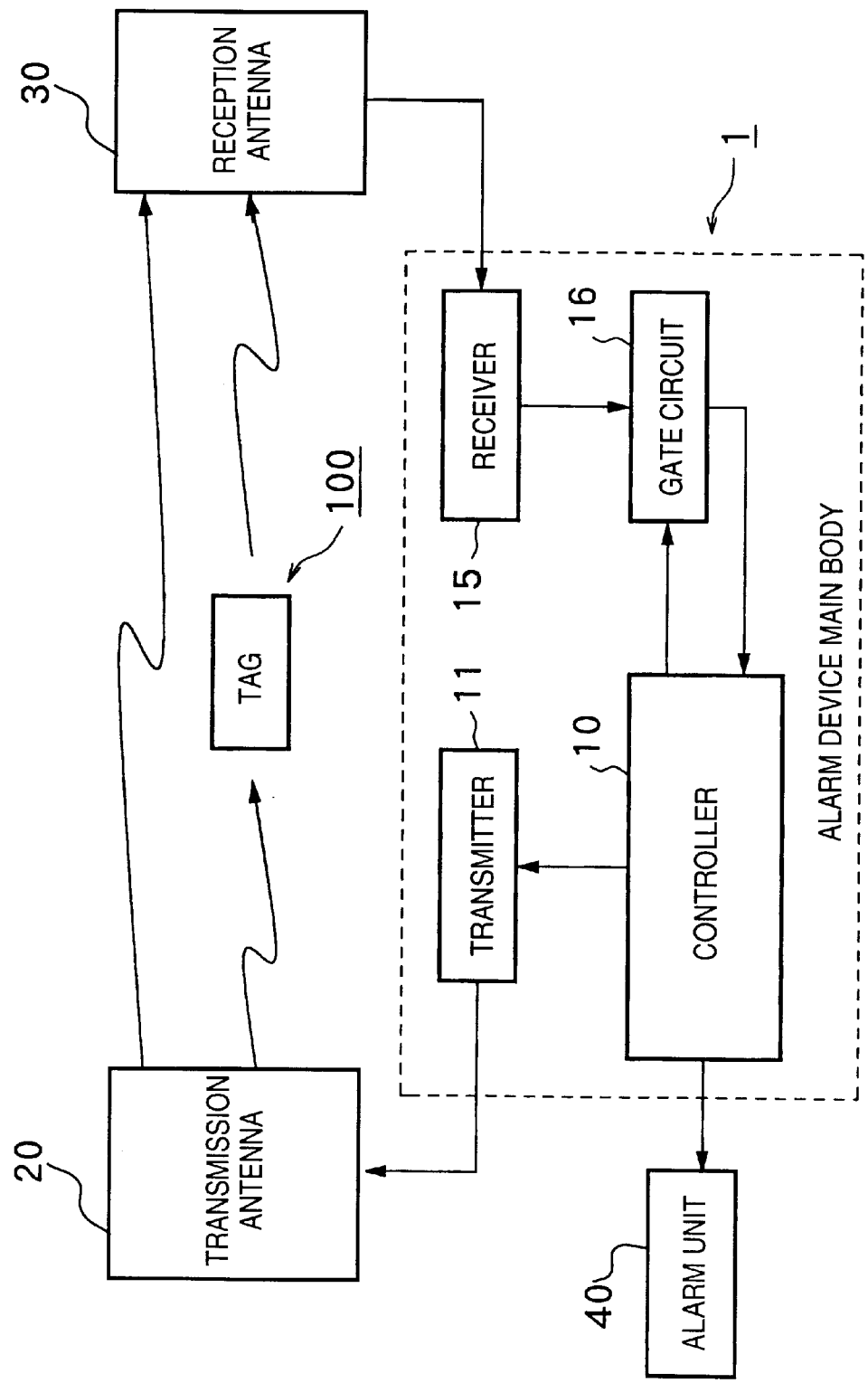
FIG. 1 is a diagram showing the entire configuration of the article monitoring system in a shop, according to the embodiment of the present invention.
Figure 2:
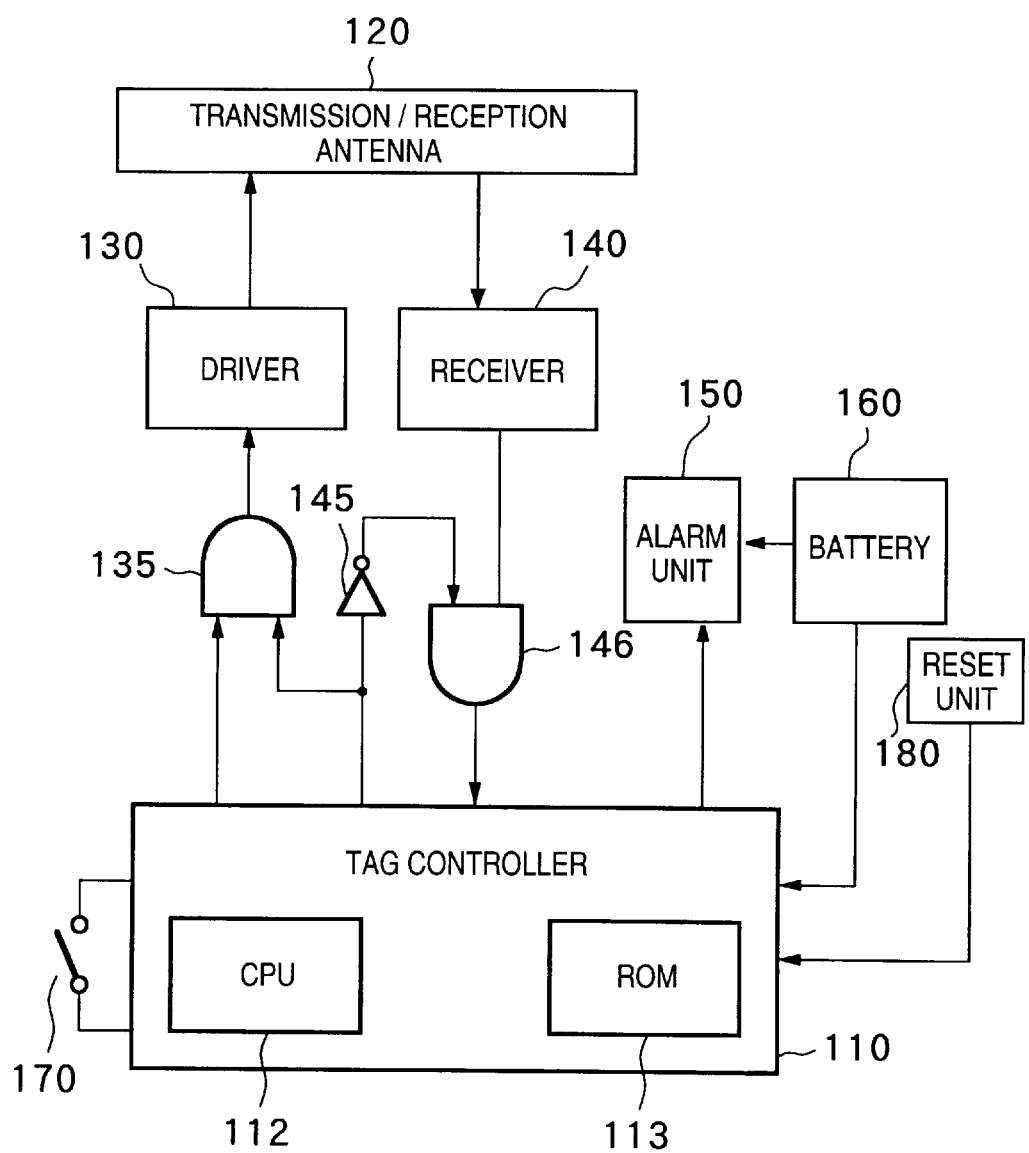
FIG. 2 is a diagram showing the detailed construction of the article monitoring apparatus (article monitoring tag) in FIG. 1.
Figure 3:
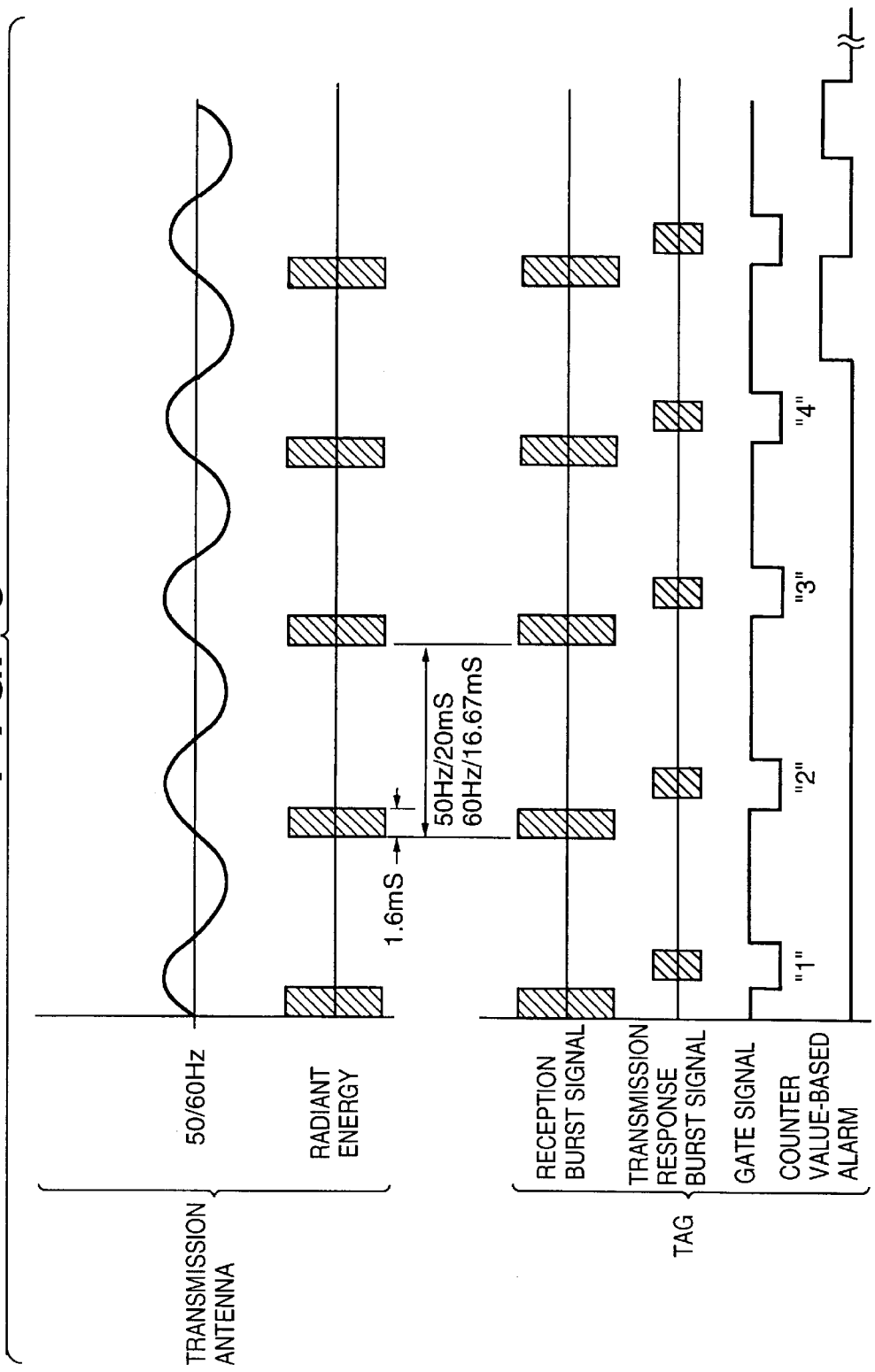
FIG. 3 is a flowchart showing an example of the operation control of the article monitoring system according to the embodiment.
Figure 4:
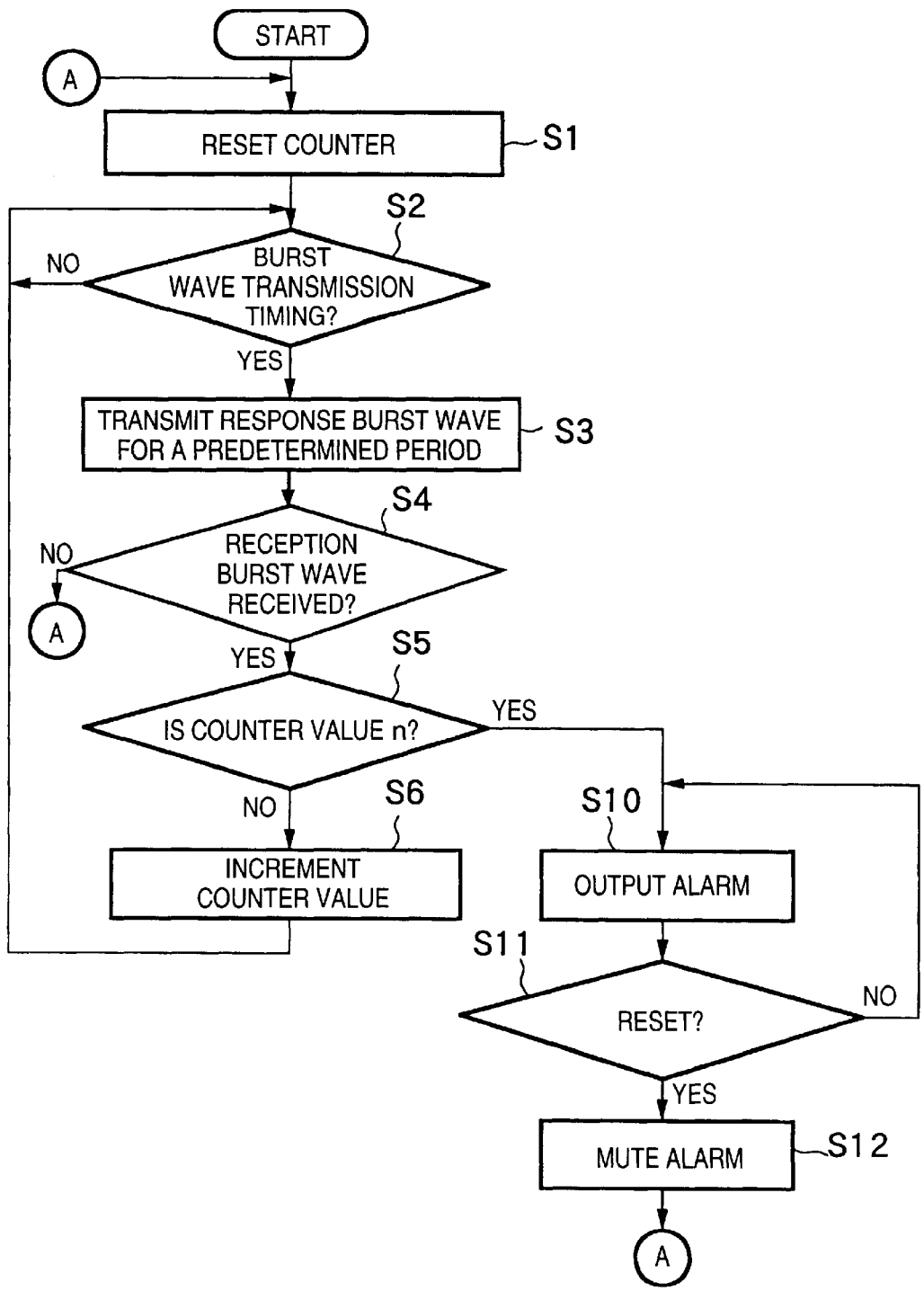
FIG. 4 is a flowchart showing the control on the alarm device (sensor gate) of the embodiment.
Figure 5:
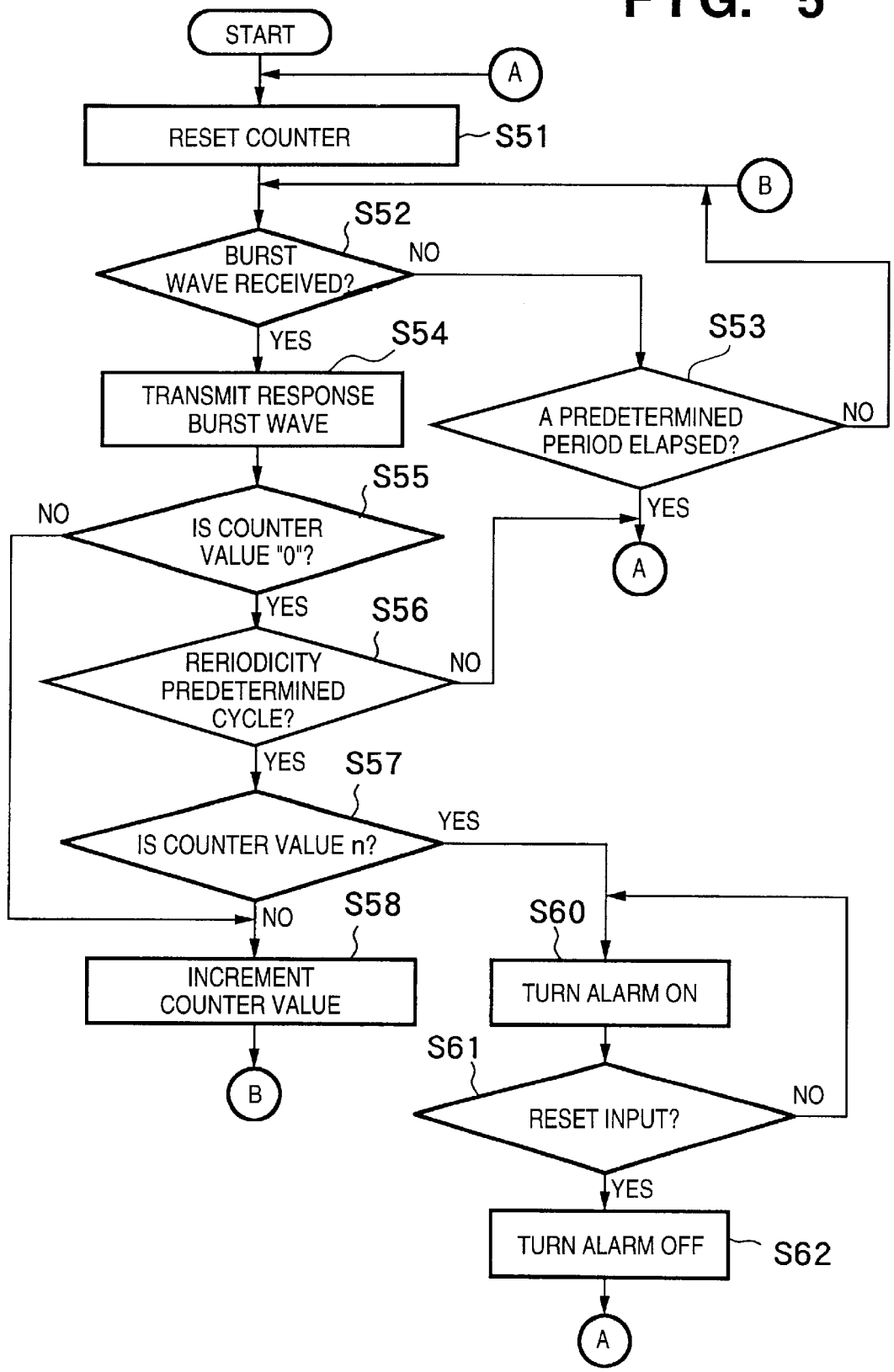
FIG. 5 is a flowchart showing control on the article monitoring apparatus (article monitoring tag) of the embodiment.

FIG. 1 is a diagram showing the entire configuration of an article monitoring system in a shop, according to an embodiment of the present invention. FIG. 2 is a diagram showing the detailed construction of an article monitoring apparatus (article monitoring tag) used in FIG. 1. FIG. 3 is a flowchart showing an example of operation control of the article monitoring system according to the embodiment. FIG. 4 is a flowchart showing control of an alarm device (sensor gate) of the embodiment. FIG. 5 is a flowchart showing control of the article monitoring apparatus (article monitoring tag) of the embodiment.

As shown in FIG. 1, in the article monitoring system in a shop, according to the embodiment, an alarm device (sensor gate) comprises an alarm device main body 1, a transmission antenna 20, a reception antenna 30 which receives radiant energy from the transmission antenna 20 and an alarm unit 40 which notifies an approach of an article monitoring apparatus (article monitoring tag). Further, numeral 100 denotes an article monitoring apparatus (article monitoring tag) attached to an article to be monitored.

The alarm device main body 1 comprises a controller 10 which controls energy radiation and detects and notifies an approach of an article monitoring apparatus (article monitoring tag), a transmitter 11 which emits radiant energy from a transmission antenna 20 under the control of the controller 10, a receiver 15 which amplifies the result of reception by a reception antenna 30, and a gate circuit 16 which selectively passes reception result, during effective reception period, based on reception energy.

Note that the alarm device main body 1 having the controller 10 and other elements is driven by a commercial alternating current power source (commercial AV). The controller 10 controls transmission of radiant energy in synchronization with the power source frequency of the commercial power source, to be described later.

The detailed construction of the article monitoring apparatus (article monitoring tag) 100 in FIG. 1 will be described with reference to FIG. 2 below.

The article monitoring apparatus (article monitoring tag) 100 comprises a tag controller 110 which performs control on reception of radiant energy, to be described later, in accordance with a control procedure stored in a ROM 113, a transmission/reception antenna 120, a driver 130 which transmits radiant energy from the transmission/reception antenna under the control of the tag controller 110, a gate circuit A135 which controls timing of radiant energy from the driver 130, a receiver 140 which detects the reception of radiant energy from the transmission/reception antenna 120 and receives the radiant energy, a gate circuit B146 which invalidates reception result by the receiver 140 during transmission timing from the driver 130, a transmission/reception controller 145 which controls transmission/reception timing, an alarm unit 150 which outputs an alarm, a battery 160 which provides a driving power source, a tag-removal detection switch 170 which is turned on where the article monitoring apparatus (article monitoring tag) 100 is attached to an article, and is turned off in status when the article monitoring apparatus is removed from the article, and a reset unit 180 which resets alarm output status.

Next, the control of the article monitoring apparatus (article monitoring tag) of the embodiment having the above construction will be described below.

The operation control of the alarm device and the article monitoring apparatus in the article monitoring system according to the embodiment will be described with reference to FIG. 3.

The controller 10 of the alarm device main body 1 of the article monitoring system of the embodiment is synchronized with a commercial alternating current frequency (50/60 Hz). As a result, in the example shown in FIG. 1, the alarm device main body 1 performs control on radiation of radiant energy from the transmission antenna and on the result of reception by the reception antenna. However, even if these controls are made by separate devices, no specific control is required for synchronization between the devices.

As a result, in a case where the transmitter is installed on a ceiling and the receiver is installed in several positions below the transmitter, the devices function as individual devices, and the operations of the receivers can be controlled separately.

Accordingly, the transmitter and the receiver can be constructed as separate devices.

As shown in an upper part of FIG. 3, a burst signal of e.g. 58 kHz is emitted by the transmission antenna 20 for a predetermined period, e.g., 1.6 mS, in synchronization with the power source frequency. For this purpose, the controller 10 outputs a signal instructing the transmitter 11 to transmit a burst signal (of 58 kHz, for example) for a predetermined period (1.6 mS, for example), and the transmitter 11 emits radiant energy corresponding to the burst signal from the transmission antenna 20. The reception antenna 30 monitors reception of the burst signal.

On the other hand, in a normal state, the article monitoring apparatus (article monitoring tag) 100 always monitors the result of reception from the transmission/reception antenna 120 and the gate circuit B146 is selected.

When reception of radiant energy corresponding to the burst signal from the transmission antenna 20 is detected, after the reception (when reception energy has disappeared) and before a predetermined period (e.g., 300 nS) has elapsed, alarming at the gate circuit B146 is inactivated. Then the gate circuit A135 is selected, to transmit a response burst signal of a frequency approximately the same of that of the received burst signal by the driver 130 for a period longer than that of reception of the burst signal. Then, after the completion of transmission, reception of burst signal from the transmission antenna 20 is monitored again. When a predetermined number of burst signals have been received, an alarm is outputted from the alarm unit 150. The alarm output is continued until the reset 180 detects a reset instruction input.

On the side of reception antenna of the alarm device main body 1, when a response burst signal has been received, it is determined that the article monitoring apparatus (article monitoring tag) 100 has approached near the transmission antenna 20 and the reception antenna 30, and an alarm is outputted from the alarm unit 40.

The details of the control of the alarm unit according to the embodiment will be described with reference to the flowchart of FIG. 4.

When the alarm device main body 1 is turned on, an internal counter (not shown) is reset at step S1. Then at step S2, the power source frequency is monitored to determine whether or not burst wave transmission timing has come. The burst wave transmission timing is, e.g., timing of conversion of the alternating current power source from a minus voltage to a plus voltage.

When the burst wave transmission timing has come, the process proceeds from step S2 to step S3 at which the transmitter 11 is instructed to transmit a burst signal of a predetermined frequency from the transmission antenna 20 periodicity. As the burst signal is transmitted in synchronization with the power source frequency, even if a plurality of transmission antennas 20 or reception antennas 30 are installed in the same shop, all the devices operate in complete synchronism, and influence from other devices can be ignored. This provides very excellent extensibility.

In the present embodiment, the frequency of the burst signal is 58 kHz, and the predetermined period is 1.6 mS. However, the frequency of the burst signal is not limited to this value, but it can be an arbitrarily frequency. Further, the burst signal output period is not limited to that in the above example.

On the transmission antenna side, it is only required to always perform the above burst wave transmission control, completely separately from the processing on the receiving side, described blow.

On the reception antenna 30 side, reception of the burst wave from the transmission antenna 20 is monitored. Then it is monitored whether or not reception of response burst signal from the article monitoring apparatus (article monitoring tag) 100 shown in a lower part of the FIG. 3 is detected within a predetermined period from the reception of the burst wave. If the response burst signal from the article monitoring apparatus (article monitoring tag) 100 is detected, the process returns to step S1.

On the other hand, after transmission termination timing of the burst signal from the transmission antenna 20, if the response burst signal from the article monitoring apparatus (article monitoring tag) 100 is detected, it is determined that the article monitoring apparatus (article monitoring tag) 100 has approached, it is examined whether or not the above-described counter value is a predetermined number "n". The predetermined number is used to prevent erroneous conclusion due to reception of noise or the like, and preferably, the number is two or greater.

If it is determined at step S5 that the counter value is not the predetermined number "n", the process proceeds to step S6, at which the counter value is incremented by one, then the process proceeds to step S2.

On the other hand, if it is determined at step S5 that the counter value is the predetermined number "n", the process proceeds to step S10, at which it is determined that the article monitoring apparatus (article monitoring tag) 100 has approached, then the alarm unit 40 is activated to output an alarm by the alarm device main body. As to an alarm, a lamp may blink or a sound is outputted, or both blink of lamp and output of sound may be performed.

At step S11, reset detection from a timer of the alarm unit 40 is monitored. When an reset instruction input has been detected, the alarm is inhibited, and the process returns to step S1.

Next, the detailed control of the article monitoring apparatus (article monitoring tag) 100 will be described with reference to the flowchart of FIG. 5. In a normal state, in the article monitoring apparatus (article monitoring tag) 100, the CPU 112 of the tag controller 110 sets the gate circuit B146 to be a selected state by setting a gate signal at a low level such that the result of reception at the transmission/reception antenna 120 can be received from the receiver 140.

The CPU 112 first resets the counter at step S51 in accordance with the control procedure stored in the ROM 113. Then at step S52, reception of burst signal from the alarm device by the transmission/reception antenna 120 is monitored. If a burst signal has not been received, the process proceeds to step S53, at which it determined that the article monitoring apparatus (article monitoring tag) 100 has approached, then the alarm unit 40 is activated to output an alarm by the alarm device main body. As to an alarm, a lamp may blink or a sound is outputted, or both blink of lamp and output of sound may be performed.

At step S11, reset detection from a timer of the alarm unit 40 is monitored. When an reset instruction input has been detected, the alarm is inhibited, and the process returns to step S1.

Next, the detailed control of the article monitoring apparatus (article monitoring tag) 100 will be described with reference to the flowchart of FIG. 5. In a normal state, in the article monitoring apparatus (article monitoring tag) 100, the CPU 112 of the tag controller 110 sets the gate circuit B146 to be a selected state by setting a gate signal at a low level such that the result of reception at the transmission/reception antenna 120 can be received from the receiver 140.

The CPU 112 first resets the counter at step S51 in accordance with the control procedure stored in the ROM 113. Then at step S52, reception of burst signal from the alarm device by the transmission/reception antenna 120 is monitored. If a burst signal has not been received, the process proceeds to step S53, at which it is monitored whether or not a predetermined period has elapsed. If the predetermined period has elapsed, the process return s to step S51, at which the counter is reset, while if the predetermined period has not elapsed, the process returns to step S52.

In the control of burst signal detection by the CPU 112, signal input status from, e.g., the gate circuit B146 is monitored, and if ON/OFF cycle corresponds with the burst signal cycle and the period is the above predetermined period, e.g., 1.6 mS, it is determined that the burst signal has been detected.

At step S52, when the burst signal has been detected, the process proceeds to step S54, at which time the CPU 112 inactivates the gate circuit B146, turns the gate circuit A145 into a selected state, and instructs the driver 130 to generate a response burst signal as shown in FIG. 3 and transmits the response burst signal by the transmission/reception antenna 120.

For example, at a point after about 160 nS has elapsed since the detection of burst signal from the alarm device (since it is detected that a time period between when it is determined that the burst signal come ON and when the burst signal goes OFF is 1.6 mS, for example), a response burst signal of a frequency approximately the same as that of the received burst signal is genera ted and transmitted. For example, a clock signal is generated for transmission of a burst signal of the same frequency as that of the reception burst signal, and the signal is supplied to the driver 130. The driver 130 drives the transmission/reception antenna 120 with an output energy of the signal.

Note that the generation of the response burst signal is not limited to the above example. An arbitrary method can be adopted as long as it is performed under the control of the CPU 112.

When the transmission of the response burst signal at step S54 has been completed, the gate circuit A135 is again inactivated, and the gate circuit B145 is selected. The process proceeds to step S55, at which it is examined whether or not the counter value is "0". That is, it is examined whether or not reception of the initial burst signal has been detected. If it is determined that the reception of the initial burst wave has been detected, the process proceeds to step S58, at which the counter value is incremented by one (for example, in case of the initial burst wave reception, the counter value is set at "1"), then the process returns to step S52.

On the other hand, if the counter value is not "0" at step S55, the process proceeds to step S56, at which the period from the previous burst signal detection to the present burst signal detection is measured. It is determined whether or not the period is a predetermined period determined by the power source frequency. For example, if the power source frequency is 50 Hz, it is determined whether or not the period is 20 mS, or if the power source frequency is 60 Hz, it is determined whether or not the period is 16.67 mS.

Note that the difference in detection period timing due to difference in power source frequencies, may be limited to one of them in advance, or selected by any instruction input, or detection period timing may be any of the periods. Thus, an arbitrary method can be adopted.

In the determination at step S56, if the period is not the predetermined period, it is determined that the previous detection was invalid, and the process returns to step S51. Note that if the process returns to step S51, as all the reception results are reset, the control may be performed such that the counter value is set at "1" and the process returns to step S52.

On the other hand, in the determination at step S56, if it is determined that the reception of burst signal in the predetermined periodicity has been detected, the process proceeds to step S57, at which it is determined whether or not the counter value of the counter has become a predetermined value "n". If the counter value is not the predetermined counter value "n", the process proceeds to step S58, at which the counter value is incremented by one, and the process proceeds to step S52. Preferably, the predetermined value is, e.g., two or greater number. This effectively prevents erroneous results, due to noise. Accordingly, preferably, a number of times to prevent erroneous results is set as this number.

Next, if it is determined at step S57 that the counter value is "n", it is determined that the predetermined number of burst signals have been received and the apparatus has approached certainly, then the process proceeds to step S60. At step S60, the alarm unit 150 is controlled to output an alarm (alarm sound). The alarm is, e.g., buzzer output repetitiously made.

At step S61, reset instruction input into the reset unit 180 is monitored, and if the reset instruction input has been made, the process proceeds to step S62. At step S62, the alarm is turned off, and the process returns to step S51.

By the above control, with the alarm from the alarm device, the article monitoring apparatus (article monitoring tag) 100 itself outputs an alarm. In this case, the burst signal detection control and the response burst signal transmission control can be realized with very general electronic circuit parts without arranging any particular device or the like.

Further, as the alarm output control can be performed with the above control, the apparatus itself can perform its own alarm output control at the same time of particular control to transmit a response burst signal to the alarm unit.

As a result, if the alarm device and the article monitoring apparatus (article monitoring tag) 100 output an alarm, it can be determined that the article monitoring apparatus (article monitoring tag) 100 has certainly approached near the alarm device, further, the approximate position can be specified from the alarm output from the alarm device, and the precise position can be specified from the alarm output position of the article monitoring apparatus (article monitoring tag) 100. Thus, article monitoring precision can be greatly improved.

Note that the above description has been made mainly to the detect the approach of an article monitoring apparatus (article monitoring tag) 100 near the alarm device, however, the article monitoring apparatus (article monitoring tag) 100 can be attached to an article to be monitored. If the apparatus is attached to an article, the switch 170 is closed. Accordingly, the CPU 112 also monitors the state of the switch 170. Once the close state has been detected for a predetermined period (e.g., several seconds), when the switch is in open state, the CPU determines that the apparatus has been removed from the article, and controls the alarm unit 150 to output an alarm.

Then, the alarm output state is maintained until the reset instruction input is made from the reset unit 180. Note that upon removal of the article monitoring apparatus (article monitoring tag) 100 from the article by payment, the reset unit 180, for example, is turned to a reset state and then the article monitoring apparatus (article monitoring tag) 100 is removed, thus an alarm is not outputted.

In the present embodiment, as the article monitoring apparatus (article monitoring tag) 100 has intelligent functions, as described above, the above-described complicated controls can be performed only by general electronic parts without any additional device.

As described above, according to the present invention, as well as an alarm from an alarm device, an alarm can be outputted from an article monitoring apparatus. Accordingly, anal arm occurrence position can be quickly specified. Further, the invention can provide article monitoring apparatus and article monitoring system which determine whether or not unpaid article is taken out with reliability.

What is claimed is:

1. An article monitoring apparatus, attached to an article monitored by an alarm device having a transmission antenna for transmitting radiant energy within a predetermined region and a reception antenna for receiving the radiant energy outputted periodically, by said transmission antenna, said apparatus comprising:
    an antenna which receives the radiant energy from said transmission antenna of said alarm device and transmits radiant energy from said apparatus to said reception antenna;
    alarm output means for outputting an alarm in response to reception of the radiant energy from said antenna; and
    control means for emitting radiant energy with similar frequency (in a similar cycle) to that of said received radiant energy from said transmission antenna, in response to reception of said radiant energy by said antenna, and driving said alarm output means when detecting a predetermined number of reception of said radiant energy, within a pre-determine time period.

2. The article monitoring apparatus according to claim 1, wherein said control means causes to transmits via said antenna to said reception antenna radiant energy corresponding to the received radiant energy.

3. The article monitoring apparatus according to claim 2, wherein said control means includes removal detection means for detecting whether or not said apparatus has ben removed from the article, and wherein said control means drives said alarm output means when removal is detected by said removal detection means.

4. The article monitoring apparatus according to claim 2, wherein said control means includes mute means for setting said alarm means to be inhibited when detecting reception of radiant energy of a predetermined pattern from said antenna.

5. The article monitoring apparatus according to claim 4, wherein said control means is a one-chip computer and an operation control procedure for said one-chip computer.

6. An article monitoring system having the article monitoring apparatus of claim 4 and an alarm device which outputs an alert when said article monitoring apparatus approaches the alarm device,
    wherein said alarm device comprises:
        a transmission antenna which transmits radiant energy within a predetermined region;
        a transmission controller for controlling said transmission antenna to transmit periodic radiant energy of a predetermined for frequency;
        a reception antenna which receives the radiant energy from said transmission antenna;

alarm output unit for outputting an alarm when detecting similar periodic radiant energy of similar frequency to that of the radiant energy from said transmission antenna, a predetermined number of times.

7. An article monitoring system having the article monitoring apparatus of claim 5 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

8. The article monitoring apparatus according to claim 2, wherein said control means is a one-chip computer and an operation control procedure for said one-chip computer.

9. An article monitoring system having the article monitoring apparatus of claim 8 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

10. An article monitoring system having the article monitoring apparatus of claim 2 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

11. The article monitoring apparatus according to claim 3, wherein said control means includes mute means for setting said alarm means to be inhibited when detecting reception of radiant energy of a predetermined pattern from said antenna.

12. The article monitoring apparatus according to claim 11, wherein said control means is a one-chip computer and an operation control procedure for said one-chip computer.

13. An article monitoring system having the article monitoring apparatus of claim 11 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

14. An article monitoring system having the article monitoring apparatus of claim 12 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

15. The article monitoring apparatus according to claim 3, wherein said control means is one-chip computer and an operation control procedure for said one-chip computer.

16. An article monitoring system having the article monitoring apparatus of claim 15 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

17. An article monitoring system having the article monitoring apparatus of claim 3 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

18. The article monitoring apparatus according to claim 1, wherein said control means includes removal detection means for detecting whether or not said apparatus has been removed from the article, and wherein said control means drives said alarm output means when removal is detected by said removal detection means.

19. The article monitoring apparatus according to claim 18, wherein said control means includes mute means for setting said alarm means to be inhibited when detecting reception of radiant energy of a predetermined pattern from said antenna.

20. The article monitoring apparatus according to claim 19, wherein said control means is a one-chip computer and an operation control procedure for said one-chip computer.

21. An article monitoring system having the article monitoring apparatus of claim 19 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

22. An article monitoring system having the article monitoring apparatus of claim 20 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

23. The article monitoring apparatus according to claim 18, wherein said control means is a one-chip computer and an operation control procedure for said one-chip computer.

24. An article monitoring system having the article monitoring apparatus of claim 23 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

25. An article monitoring system having the article monitoring apparatus of claim 18 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

26. The article monitoring apparatus according to claim 1, wherein said control means includes mute means for setting said alarm means to be inhibited when detecting reception of radiant energy of a predetermined pattern from said antenna.

27. The article monitoring apparatus according to claim 26, wherein said control means is a one-chip computer and an operation control procedure for said one-chip computer.

28. An article monitoring system having the article monitoring apparatus of claim 26 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

29. An article monitoring system having the article monitoring apparatus of claim 27 and an alarm device which outputs an alert when said article monitoring apparatus approaches the alarm device,
wherein said alarm device comprises:
a transmission antenna which transmits radiant energy within a predetermined region;
a transmission controller for controlling said transmission antenna to transmit periodic radiant energy of a predetermined for frequency;
a reception antenna which receives the radiant energy from said transmission antenna;
alarm output unit for outputting an alarm when detecting similar periodic radiant energy of similar frequency to that of the radiant energy from said transmission antenna, a predetermined number of times.

30. The article monitoring apparatus according to claim 1, wherein said control means is a one-chip computer and an operation control procedure for said one-chip computer.

31. An article monitoring system having the article monitoring apparatus of claim 30 and an alarm device which outputs an alert when said article monitoring apparatus approaches the alarm device,
wherein said alarm device comprises:
a transmission antenna which transmits radiant energy within a predetermined region;

a transmission controller for controlling said transmission antenna to transmit periodic radiant energy of a predetermined for frequency;

a reception antenna which receives the radiant energy from said transmission antenna;

alarm output unit for outputting an alarm when detecting similar periodic radiant energy of similar frequency to that of the radiant energy from said transmission antenna, a predetermined number of times.

32. An article monitoring system having the article monitoring apparatus of claim 1 and an alarm device which outputs an alert when said article monitoring apparatus approaches the alarm device, wherein said alarm device comprises:

a transmission antenna which transmits radiant energy within a predetermined region;

a transmission controller for controlling said transmission antenna to transmit periodic radiant energy of a predetermined for frequency;

a reception antenna which receives the radiant energy from said transmission antenna;

alarm output unit for outputting an alarm when detecting similar periodic radiant energy of similar frequency to that of the radiant energy from said transmission antenna, a predetermined number of times.

* * * * *

UNITED STATES PATENT AND TRADEMARK OFFICE
CERTIFICATE OF CORRECTION

PATENT NO. : 6,958,695 B2  
APPLICATION NO. : 09/914618  
DATED : October 25, 2005  
INVENTOR(S) : Kunihiko Imafuku Page 1 of 1

It is certified that error appears in the above-identified patent and that said Letters Patent is hereby corrected as shown below:

Column 1, Line 4: change "February 2, 2000" to --February 29, 2000--.

Column 5, Line 4: change "blow" to --below--.

Column 5, Line 37: change "an" to --a--.

Column 5, Delete Lines 48-66:
Delete the paragraph beginning with "The CPU 112 first resets the counter at step S51 in . . ."
Through the sentence ending "article monitoring apparatus (article monitoring tag) 100, the"

Column 6, Delete Lines 1-4:
Delete the section beginning with "The CPU 112 of the tag controller 110 sets the gate circuit B146 . . ."
Through the sentence ending "antenna 120 can be received from the receiver 140."

Column 6, Line 12: change "return s" to --returns--.

Column 6, Line 35: change "genera ted" to --generated--.

Column 7, Line 55: delete "the" (first occurrence)

Column 8, Line 14: change "anal arm" to --an alarm--.

Column 8, Line 45: change "ben" to --been--.

Signed and Sealed this

Sixth Day of February, 2007

JON W. DUDAS  
*Director of the United States Patent and Trademark Office*